United States Patent [19]

Hess et al.

[11] Patent Number: 4,668,441
[45] Date of Patent: May 26, 1987

[54] PROCESS AND APPARATUS FOR INTIMATE CONTACTING OF A PLURALITY OF PHYSICALLY DISPARATE PHASES, AT LEAST ONE OF WHICH BEING GASEOUS

[75] Inventors: Raoul Hess, Chatillon/Sous/Bagneux; Bernard Mirabel, Orly, both of France

[73] Assignee: Rhone-Poulenc Specialites Chimiques, Courbevoie, France

[21] Appl. No.: 355,701

[22] Filed: Mar. 8, 1982

[30] Foreign Application Priority Data

Mar. 13, 1981 [FR] France ................................. 8105032

[51] Int. Cl.⁴ .............................................. B01F 3/04
[52] U.S. Cl. ..................................... 261/79.2; 55/236;
159/4.01; 159/48.1; 239/402.5; 239/405;
239/406; 261/116; 422/224
[58] Field of Search ................... 261/18 R, 79 A, 116;
55/234, 235, 236, 237, 238; 159/4 B, 48.1;
239/402.5, 405, 406; 422/224

[56] References Cited

U.S. PATENT DOCUMENTS

| | | | |
|---|---|---|---|
| 1,490,281 | 4/1924 | Leach | 261/79 A |
| 2,029,141 | 1/1936 | Warner | 239/399 X |
| 2,065,042 | 12/1936 | Berryman | 239/402.5 X |
| 2,094,943 | 10/1937 | Gianola | 239/402.5 X |
| 3,514,924 | 6/1970 | Flebu | 55/237 |
| 3,761,065 | 9/1973 | Rich et al. | 261/116 X |
| 3,930,816 | 1/1976 | Miczek | 261/79 A X |
| 4,015,958 | 4/1977 | Leschonski et al. | 55/235 |
| 4,267,131 | 5/1981 | Prudhon et al. | 261/79 A X |
| 4,308,039 | 12/1981 | Djololian et al. | 261/79 A X |
| 4,320,092 | 3/1982 | Kondo et al. | 261/116 X |

Primary Examiner—Richard L. Chiesa
Attorney, Agent, or Firm—Burns, Doane, Swecker & Mathis

[57] ABSTRACT

A phase contactor is provided with guide means along the path of flow of the vertically descending current of first gaseous phase established therein, but upstream of the zone of restricted flow passage, the guide means being adapted to adjust the flow of the first gaseous phase and to retard/prevent the deposition of objectionable encrusting solids within the phase contactor.

7 Claims, 10 Drawing Figures

PROCESS AND APPARATUS FOR INTIMATE CONTACTING OF A PLURALITY OF PHYSICALLY DISPARATE PHASES, AT LEAST ONE OF WHICH BEING GASEOUS

BACKGROUND OF THE INVENTION

1. Field of the Invention

The present invention relates to the intimate contacting or admixture of a plurality of physically distinct phases, at least one of which being a gaseous phase, and plural phase oontactor therefor. The invention is especially well adapted for various drying operations.

2. Description of the Prior Art

In copending application, Ser. No. 916,477, filed June 19, 1978 (now abandoned), a continuation of Ser. No. 770,802, filed Apr. 19, 1977 (now abandoned), which itself is a continuation of Ser. No. 479,774, filed June 17, 1974 (also now abandoned), all assigned to the assignee hereof, there is disclosed and claimed novel means for the intimate contacting of a plurality of physically disparate phases, at least one of which being a gaseous phase, which may comprise solid or liquid particulates, and with another phase being dispersible therein, e.g., a liquid, solution or suspension phase, or optionally a solids phase, such as a powder.

The process disclosed in the aforesaid '477 application features the intimate contacting of substances which are in different phases, at least one of which is in a gaseous or vapor phase with or without entrained solids in solution or dispersion comprising:

(i) introducing said phase into a flow of helical paths which are symmetrical with respect to a plane passing through the axis of flow;

(ii) passing said symmetrical flow through a restricted passage of circular cross-section having its center along the axis of the symmetrical helical flow;

(iii) allowing said flow of said phase to pass through said restricted passage into a circular space whereby the path of movement of said phase following passage through the restricted opening is in the form of layered stacks of a plurality of hyperboloids;

(iv) introducing a fluid as a liquid stream in rectilinear flow through the restricted passage along the axis of helicoidal flow, with said liquid stream being introduced through a conduit spaced from the plane of the restricted flow passage of the helicoidal flow by a length which is between zero and the mean radius of said flow passage; and (v) imparting to the phase forming the helicoidal symmetrical flow a momentum at the level of the restricted passage of at least 100 times greater than the momentum of the fluid in rectilinear flow, whereby the fluid constituting the continuous rectilinear flow is broken up upon engagement with the phase in helicoidal flow into small particles which become entrained by the phase in helicoidal flow for movement therewith in the same direction and intensity.

Thus, a region of plug flow type is established, as from contact between the phases, producing regular and instantaneous treatment of the dispersible phase which generally constitutes the phase to be treated. The treatment is of flash type, namely, it is very short, and may be accompanied by a substantial difference in temperature between the phases.

The foregoing process enjoys many advantages and benefits, both from the point of view of granulometry, fineness and narrow range of distribution, and from the point of view of the treatment, homogeneity of treatment, from one particle to the other, and speed of treatment. It will be readily appreciated that the requirements involved in regard to actually carrying out the process are nonetheless very severe.

And said '477 copending application also describes and claims various means for producing the tangential movement, by introducing the gaseous phase tangentially with respect to the dispersible phase or by arranging a helicoidal strip or deflector vanes around a central pipe for guiding the dispersible phase.

However, a serious problem exists in the quality of the symmetry of the flow. It is for this reason that copending application, Ser. No. 916,477, also claims a multi-tangential distribution system comprising an annular space which is fed by way of at least one tangential inlet and which is delimited inwardly of the apparatus by a perforated wall, each perforation acting as a tangential inlet.

This apparatus provides flow of a sufficient quality, in many cases.

Unfortunately, it has been found that for some applications there result deposits of material adhering to the walls of the contact chamber.

It too has been proposed to overcome certain problems, including that of objectionable deposition of encrusting solids, by creating a cooling region at the level of the contact region, as described in U.S. Pat. No. 4,263,234, also assigned to the assignee hereof, and it has also been envisaged that the quality of flow may be improved by optimizing the various possible parameters of the apparatus, e.g., the shape of the holes, the physical arrangements, and the like.

It has been observed from experimentation that two parameters are important: the speed of rotation of the helicoidal flow and its speed of linear advance, the same being the "downward" movement, with the apparatus generally being positioned vertically. Indeed these factors vary depending upon the nature of the product to be treated, in fact in accordance with the rheology of the dispersible phase. It thus logically follows that, if it is to be satisfactory, any solution to the aforesaid problem must accommodate all variations in process parameters.

Also compare U.S. Pat. Nos. 3,758,081, 4,086,099, 4,124,353, 4,257,339, 4,265,702, 4,267,131 and 4,308,039, all assigned to the assignee hereof.

SUMMARY OF THE INVENTION

Accordingly, a major object of the present invention is the provision of an improved process for the intimate contacting of plural, physically disparate phases, and phase contactor therefor, which process/apparatus features interposing certain guide means along the path of helicoidal flow, as described in the noted '477 application, but upstream of the point of contact with the physically disparate second phase, and which interposition obviates that aforesaid problem of objectionable deposition of encrusting solids within the apparatus itself.

BRIEF DESCRIPTION OF THE DRAWINGS

FIG. 3b is a top diagrammatical cross-sectional view of the head of the phase contactor illustrated in FIG. 3a;

FIG. 4b is a top diagrammatical cross-sectional view of the head of the phase contactor illustrated in FIG. 4a;

FIG. 5b is a top diagrammatical cross-sectional view of the head of the phase contactor illustrated in FIG. 5a;

FIG. 6b is a top diagrammatical cross-sectional view of the head of the phase contactor illustrated in FIG. 6a.

DETAILED DESCRIPTION OF THE INVENTION

Figure 1:
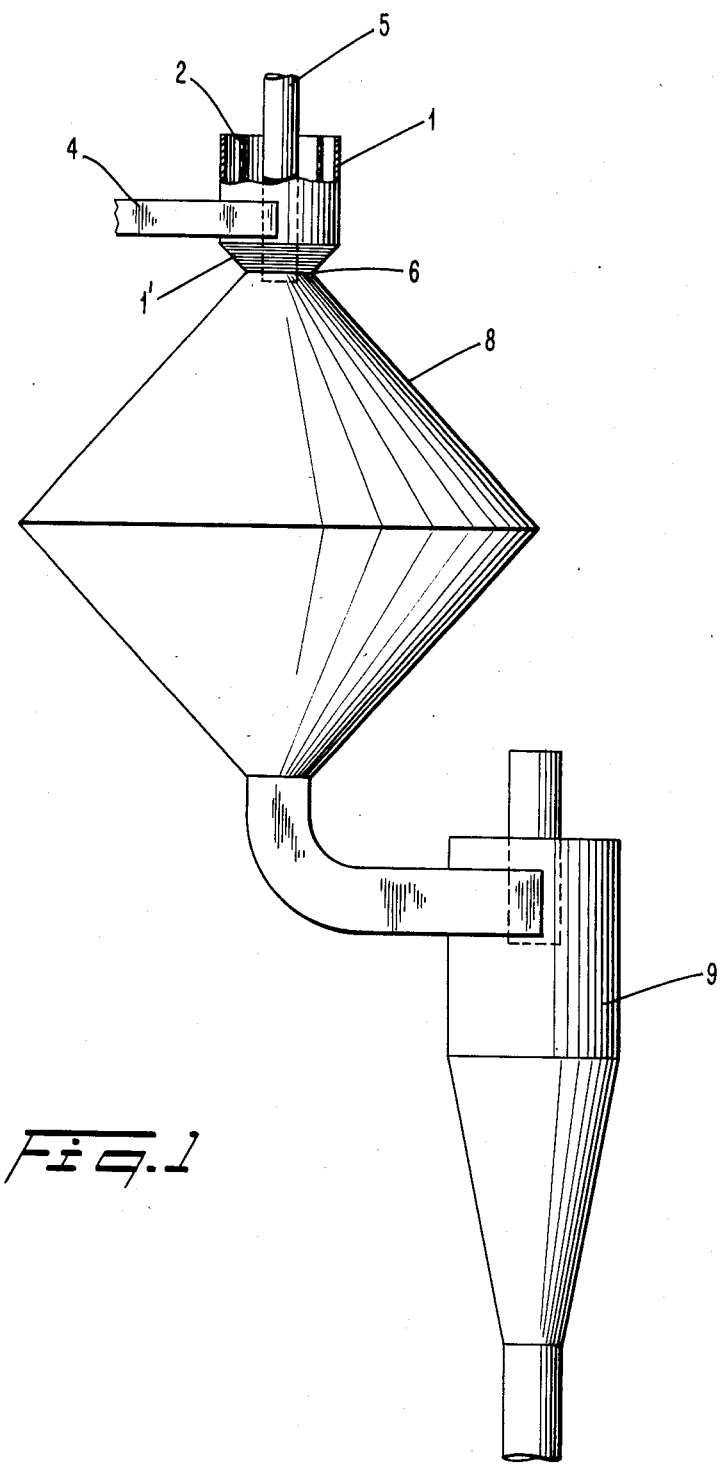
FIG. 1 is a schematic/diagrammatic side elevational view, partially in cross-section, of one embodiment of a phase contactor according to the invention.
Figure 2:
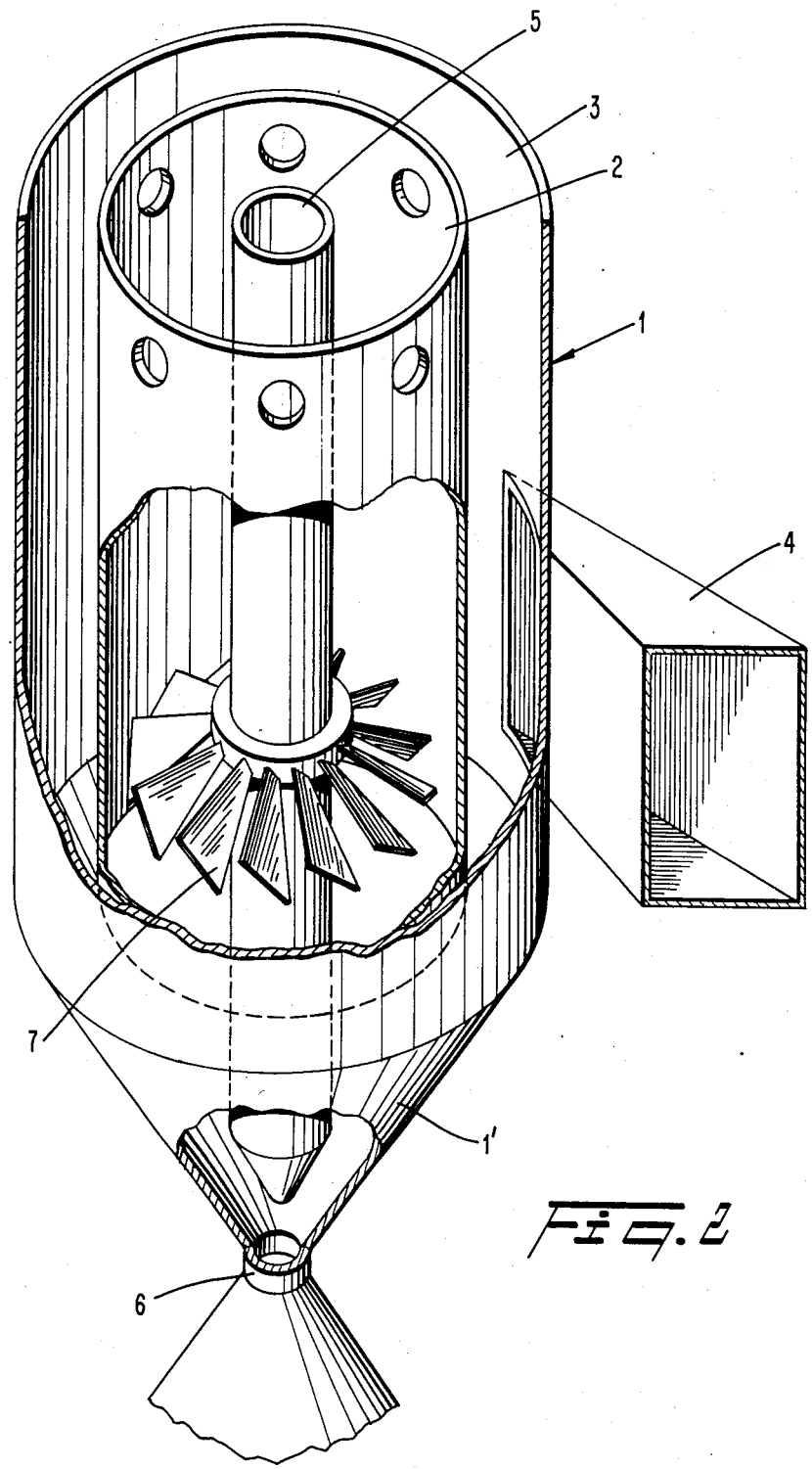
FIG. 2 is a perspective view, partially broken away to show various elements, of the head of a phase contactor according to the invention.

More particularly according to the present invention, and referring specifically to the Figures of Drawing, in FIGS. 1 and 2 there is illustrated a phase contactor basically as shown in the aforesaid copending application, Ser. No. 916,477. Such phase contactor includes a "head" member 1 provided with at least one perforated inner wall member or sleeve 2 defining an annular space 3 into which inlets the at least tangential feed inlet 4, and said head member 1 terminating in an outlet or confining zone 6 of restricted flow passage.

Extending coaxially through said head 1 is an internal tubular conduit or inlet pipe 5, the same coaxially extending through the upside end of the head or casing 1 and deep within the truncated cone area 1' thereof which terminates in said zone 6 of restricted flow passage. The downstream outlet end of said inlet conduit 5 opens at the level of the zone 6 of restricted flow passage, plus or minus the radius of the cross-section of said zone 6 of restricted flow passage.

The perforated inner wall member or sleeve 2 enables the establishment of a regularly repeating, helical path of axially extending downward flow which is essentially symmetrical with respect to at least one plane passing through the axis of the helical flow, such flow being established by means of the helical trajectory inducing inlet 4 for one of the phases.

Shown in FIG. 2 is the at least one guide means 7 according to the invention, upstream of the zone 6 of restricted flow passage. Being thus disposed within the head 1 of the subject phase contactor, the guide means/vanes 7 are situated along the downward path of the helicoidal flow and is adapted to beneficially regulate the same.

The guide means 7 may take any one of a number of forms. In a simple form, it comprises at least one support ring member provided with a plurality of orientable vanes. Being so constructed, only the angle of inclination of the several vanes has to be adjusted, in order to adjust the characteristics of flow.

The guide means 7 may also be mounted in such fashion as to be slideable along the inlet conduit 5. It is also possible to provide a plurality of guides such as the guide 7.

The head member 1 comprises a casing, such as a casing of revolution, a cylindrical casing or a toric casing, but it remains within the scope of the present invention for the casing to be of such a size and shape that the annular space 3 may be of decreasing or increasing cross-section.

The apertured or perforated wall member or sleeve 2 is rotationally symmetrical to effect a properly symmetrical flow.

In general, the apparatus according to the invention further comprises a contact chamber 8 and a cyclone separator 9 for separation of the phases. See generally the noted '477 application.

The contact chamber 8 may comprise a double-cone arrangement of apparatus or a cylindrical chamber, or a chamber of any suitable form.

The apparatus according to the invention enables one to facilely carry out the process described in said copending application, Ser. No. 916,477, namely, the efficacious treatment of a gaseous phase comprising a gas which either may or may not contain entrained solid or liquid particles, the same being introduced by way of the tangential feed inlet or inlets 4.

The dispersible phase, optionally a gaseous phase, is introduced by way of the feed conduit or conduits 5, and momenta are imparted to the two phases, such that the ratio between the momentum of the gaseous phase and that of the dispersible phase is at least one hundred, preferably from 1000 to 10000.

The rate of inlet flow of the dispersible phase is low, lower than 10 m/sec, preferably lower than 5 m/sec.

Likewise, the pressure on the gaseous phase is at a low level, lower than $10^5$Pa, and typically from 0.4 to 0.6 $10^5$Pa. These values are not limiting, but correspond to advantageous conditions for carrying out the subject process, under normal operating conditions.

The apparatus according to the invention may be used for drying various substances from solutions or suspensions and it may also be used as a chemical reactor. In particular, it is possible to produce a pre-dispersion as disclosed in French patent application No. 80/17960, or to effect co-pulverization with a chemical reactant, as in copending application, Ser. No. 304,938, filed Sept. 23, 1981, now U.S. Pat. No. 4,447,331 and both also assigned to the assignee hereof.

However, as hereinbefore mentioned, the present invention is of especial interest in regard to certain uses heretofore resulting in materials being deposited in the contact chamber.

Moreover, while the skilled artisan would have expected that incorporating the guide means 7 would give rise to certain disadvantages, such as a pressure drop, with an adverse effect on efficiency (see Perry and Chilton, *Chemical Engineers'Handbook,* 5th Edition, 20–86, McGraw-Hill Book Company), the guide means according to the invention makes it possible for the objectionable deposition problem to be solved in a simple manner. It has been found that in fact, depending upon the angle of inclination of the vanes, deposition occurs at the top or at the bottom of the contact chamber, or is completely eliminated, which is the desired result.

The upshot of the immediately foregoing is that, without having to resort to laborious development and adjustment process, the skilled artisan can readily determine the conditions of operation of the apparatus, simply by carrying out a few routine tests or experiments, which moreover permits the skilled operator to use the same apparatus for solutions or suspensions having different rheologies, without additional parts, simply by making an easy adjustment.

In order to further illustrate the present invention and the advantages thereof, the following specific examples are given, it being understood that same are intended only as illustrative and in nowise limitative.

In the examples which follow, the phase contactor employed was that depicted in the Figures of Drawing.

The feed solution of the examples was a solution of lactoserum proteins which were concentrated by ultrafiltration. Such proteins are particularly sensitive to temperature.

The examples were carried out using solutions having the following characteristics:

| | | |
|---|---|---|
| (i) | Dry extract | 20% |
| (ii) | Protein | 65% |
| (iii) | Lactose | 25% |
| (iv) | pH value | 5.35 |

FIGS. 3 to 6 illustrate various possible apparatus arrangements.

The duration of each test was 1 hour.

EXAMPLE 1

Figure 3A:
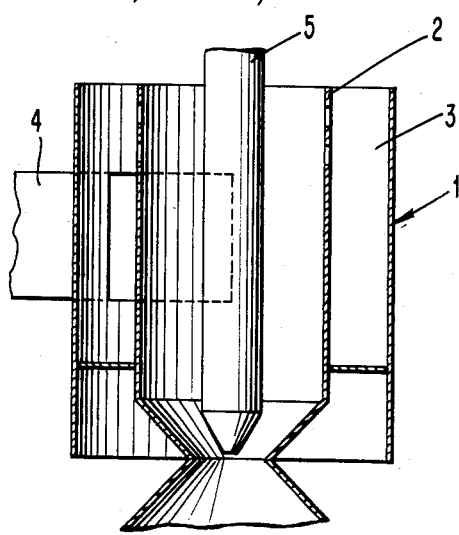
FIG. 3a is a side elevational, diagrammatical cross-sectional view of the head of a phase contactor without any guide means according to the invention.
Figure 4A:
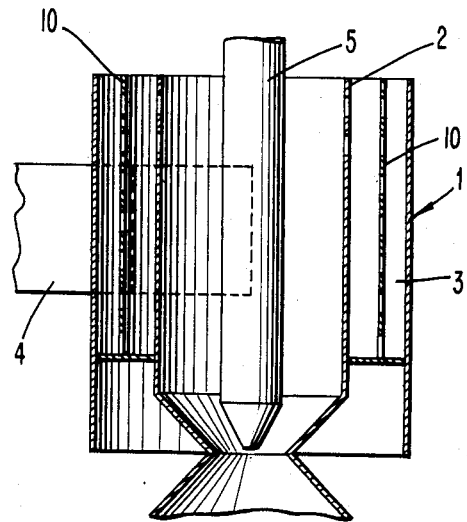
FIG. 4a is a side elevational, diagrammatical cross-sectional view of the head of another phase contactor without any guide means according to the invention.
Figure 3B:
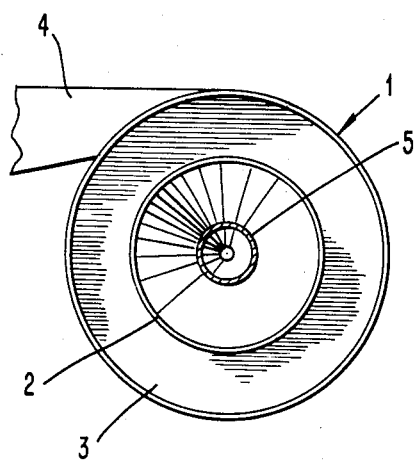
Figure 4B:
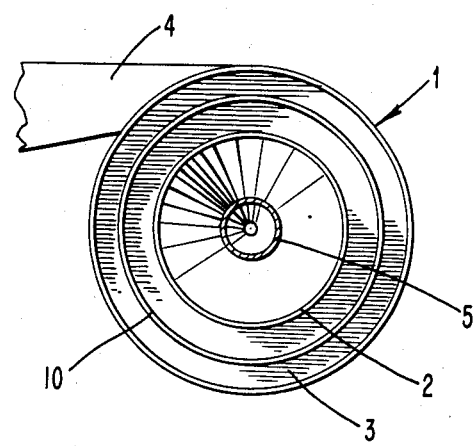

This example employed an apparatus as shown in FIG. 3, equipped with a perforated sleeve 2 in the head member 1.

The above-indicated solution was introduced into the contactor, via the inlet conduit 5, at a flow rate of 80 l/h.

Dispersion was effected solely by the tangential effect of the hot gas (inlet temperature: 500° C.; outlet temperature: 120° C.) which was injected through the inlet 4 at a flow rate of about 350 m³/h.

An irregular deposit was found on the upper cone. The thickness of the deposit varied from a few millimeters (3 to 5) to a few centimeters.

EXAMPLE 2

An attempt was made to improve the arrangement, by incorporating a preliminary perforated basket member or sleeve 10 disposed between the tangential intake 4 and the sleeve member 2. An improvement in distribution was determined, but there also resulted substantial deposits on the bottom cone, of 3 to 4 cm (see FIG. 4).

EXAMPLE 3

A vaned guide assembly 7 was added, with the vanes 7 being inclined at an angle of 45°. The vanes were made to rest upon the diaphragm. The vortex or swirl effect was poor, however, and irregular deposits were again detected (see FIG. 5).

EXAMPLE 4

The position of the guide means 7 was raised. The resulting deposit was 3 mm in thickness on the upper cone, and only traces were found on the bottom cone.

EXAMPLE 5

The angle of inclination of the guide vanes was increased to 75° and the deposit became less on the upper cone and increased on the lower cone.

These examples clearly illustrate the advantages of the present invention. In fact, in practice it is difficult and expensive to improve the flow characteristics, on the basis of the perforated basket or sleeve arrangements.

It will be seen that, with a flow which is of initially poor quality, in accordance with this invention and in a highly empirical manner, by means of a few adjustments relating to the angle of inclination of the vanes and the positioning thereof, an excellent flow regulating result is achieved and the problem of deposition of objectionable solids is vastly alleviated.

Figure 5A:
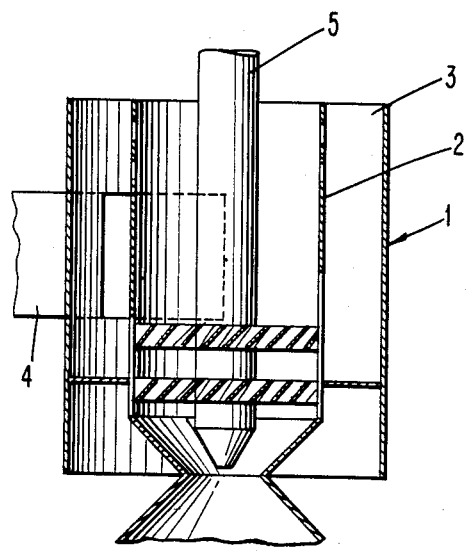
FIG. 5a is a side elevational, diagrammatical cross-sectional view of the head of a phase contactor embodying certain guide means according to the invention.
Figure 6A:
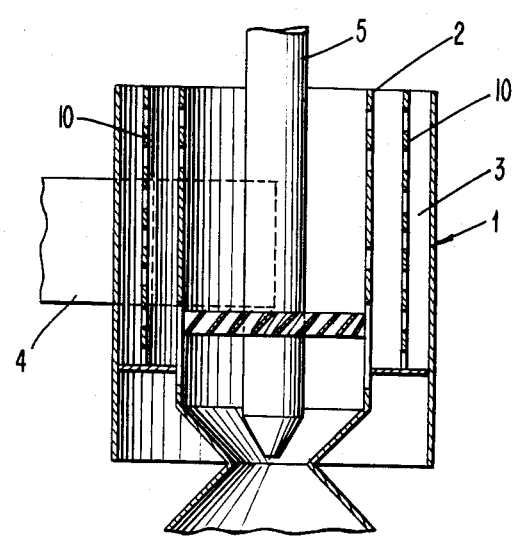
FIG. 6a is a side elevational, diagrammatical cross-sectional view of the head of a phase contactor embodying other and different guide means according to the invention.
Figure 5B:
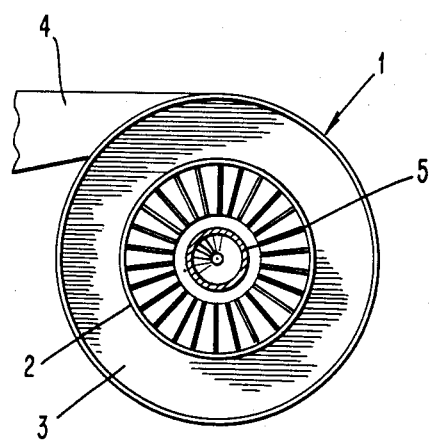
Figure 6B:
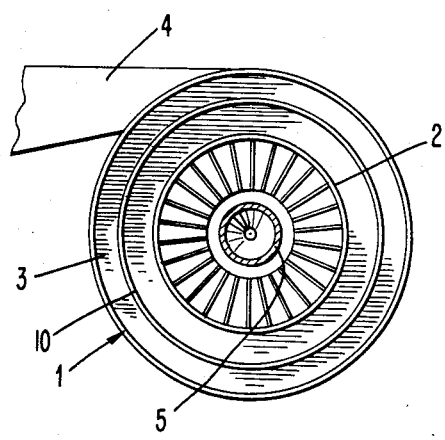

As aforesaid, the foregoing examples are in nowise limiting, it of course being envisaged to provide the subject phase contactor with a plurality of rows of vanes, as illustrated in FIG. 5.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a phase contactor for the intimate contacting of plural, physically disparate phases, at least one of which being a gaseous phase, comprising (i) a distribution zone, said distribution zone being comprised of means for establishing a vertically descending current of axially extending, axially symmetrical helical flow of a first gaseous phase, means for separately establishing a current of coaxially vertically downwardly extending, rectilinear continuous jet stream of a physically disparate second phase, and means for insuring physical separation from each other of said currents of said first and second phase, and (ii) a contact zone, said contact zone being comprised of a zone of restricted flow passage with respect to the means for establishing the helical flow, means for the convergence of the separately supplied disparate phases, means for imparting a momentum to the gaseous first phase helical flow which is at least 100 times greater than the momentum of the second phase, coaxial rectilinear flow, the improvement which comprises (iii) at least one guide neans disposed within the helical flow path of said vertically descending current of said first gaseous phase, but upstream of said zone of restricted flow passage, and said guide means being adapted to regulate the speed of rotation and the speed of linear advance of the flow of said first gaseous phase to retard the deposition of objectionable solids within the phase contactor.

2. The phase contactor as defined by claim 1, said means for separately establishing said current of the physically disparate second phase openly communicating at the level of said zone of restricted flow passage, plus or minus the radius of the cross-section of said zone of restricted flow passage.

3. The phase contactor as defined by claims 1 or 2, said guide means being mounted as to be slidably movable along the means for separately establishing said current of the physically disparate second phase.

4. In a process for the intimate contacting of plural, physically disparate phases, at least one of which being a gaseous phase, comprising (i) establishing a vertically descending current of axially extending, axially symmetrical helical flow of a first gaseous phase, (ii) separately establishing a current of coaxially downwardly vertically extending, rectilinear continuous jet stream of a physically disparate second phase, (iii) maintaining said currents of said first and second phases physically separate from each other, (iv) directing said currents which comprise the plural phases to a zone of restricted flow passage with respect to said helical flow, (v) at said zone of restricted flow passage, converging said plural currents, and atomizing and entraining said rectilinear jet stream current within said helical current of gaseous flow, and maintaining at such zone of convergence a momentum of the first phase helical flow of at least 100 times greater than the momentum of the second phase, coaxial rectilinear flow, the improvement which comprises (vi) interposing at least one guide means in the helical flow path of said vertically descending current of first gaseous phase, but upstream of said zone of restricted flow passage, to thereby regulate the speed of rotation and the speed of linear advance of the flow of said first gaseous phase to retard the deposition of objectionable encrusting solids.

5. A phase contactor for the intimate contacting of plural, physically disparate phases, at least one of which is a gaseous phase, comprising:

a distribution zone including means for establishing a vertically descending helical current of a first gaseous phase, means for separately establishing a current of coaxially vertically downwardly extending, rectilinear continuous jet stream of a physically disparate second phase, and means for insuring physical separation from each other of said current of said first and second phases;

a contact zone including a zone of restricted flow passage with respect to the means for establishing the helical flow, means for convergence of the separately supplied disparate phases, and means for imparting a momentum to the gaseous first phase helical flow which is at least 100 times greater than the momentum of the second phase, coaxial rectilinear flow; and a plurality of angularly adjustable vane blades disposed within the helical flow path of said vertically descending current of the first gaseous phase, upstream of said zone of restricted flow passage, said vane blades being oriented to pivot about respective axes which are transverse to the vertically descending component of said helical current to regulate the flow of the first gaseous phase so as to retard the deposition of objectionable solids within the phase contactor.

6. The phase contactor as defined by claim 5, said guide means being mounted as to be slidably movable along the means for separately establishing said current of the physically disparate second phase.

7. The phase contactor of claim 5 wherein said pivot axes are radially oriented with respect to the longitudinal axis of said rectilinear jet stream.

* * * * *